July 10, 1928.
J. H. TAYLOR
SHOCK ABSORBER FOR MOTOR VEHICLES
Filed Sept. 29, 1927
1,676,808
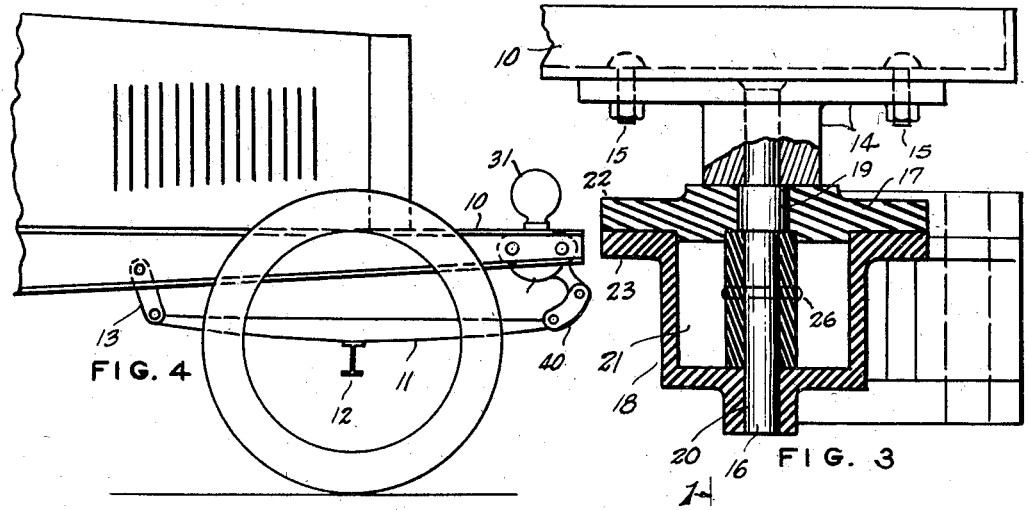
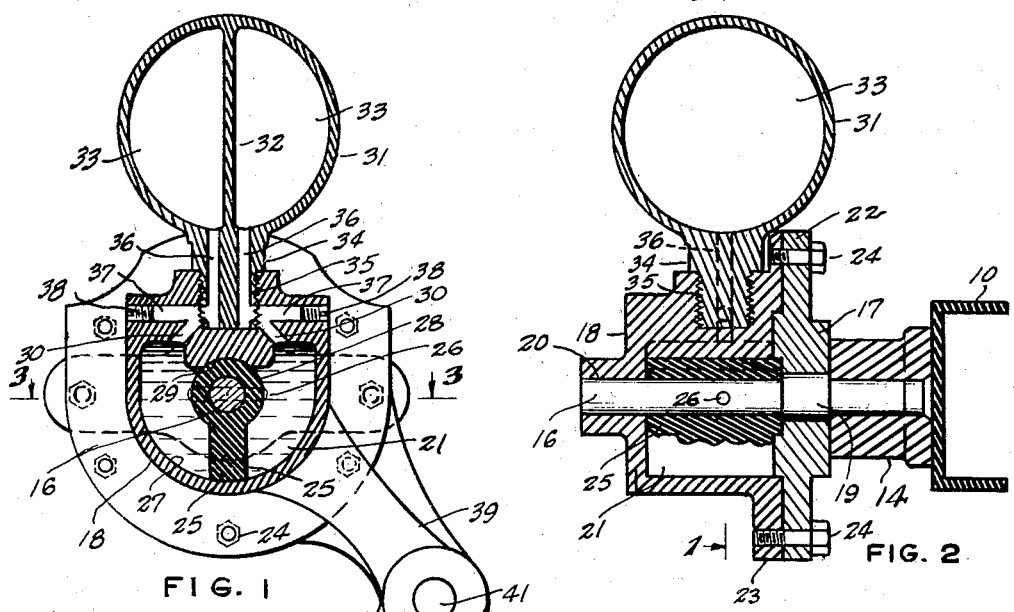
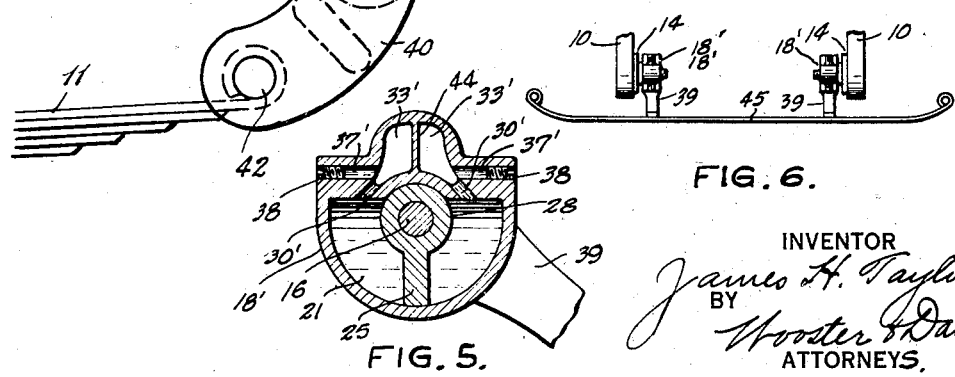
INVENTOR
James H. Taylor
BY
Wooster & Davis
ATTORNEYS.

Patented July 10, 1928.

1,676,808

UNITED STATES PATENT OFFICE.

JAMES HENRY TAYLOR, OF DEVON, CONNECTICUT, ASSIGNOR OF ONE-HALF TO WILLIAM T. TEEDEN, JR., OF DEVON, CONNECTICUT.

SHOCK ABSORBER FOR MOTOR VEHICLES.

Application filed September 29, 1927. Serial No. 222,761.

This invention relates to a shock absorber for automobiles or other vehicles, and has for an object to provide an improved device to lessen shocks caused by irregularities in the road and particularly to lessen the rebound of the vehicle body after a depression of the springs and thus decrease the liability of the springs breaking under this rebound.

It is also an object of the invention to provide a device of this character which is very simple in construction and does not involve the use of rubber or similar material which will deteriorate and thus become inefficient or inoperative, and in which there are no valves to become misplaced or jammed.

It is a further object of the invention to provide a device of this character which may also be used as a cushioning device for automobile bumpers to prevent the shock on a bumper from being transmitted directly to the frame of the car.

With the foregoing and other objects in view, I have devised the construction illustrated in the accompanying drawing forming a part of this specification. In this drawing, Fig. 1 is a vertical section through the device subtantially on line 1—1 of Fig. 2.

Fig. 2 is a vertical section taken substantially at right angles to Fig. 1.

Fig. 3 is a horizontal section substantially on line 3—3 of Fig. 1.

Fig. 4 is a somewhat diagrammatical side elevation of the front of a motor vehicle showing my device in position.

Fig. 5 is a view similar to Fig. 1 showing in section a slightly different construction of the body, and Fig. 6 is a top plan view showing how the device may be used as a cushioning device for a bumper.

In the drawing 10 represents one of the side members of the vehicle frame and 11 one of the front springs of the usual leaf construction secured in any suitable manner to the axle 12, and connected at its rear end by any suitable means as a link 13 to the frame. At its forward end it is connected to the frame through my improved shock absorber in a manner presently to be described.

This shock absorber comprises a bracket 14 adapted to be secured to some stationary portion of the vehicle, preferably the frame 10, by any suitable means, such as bolts 15. Carried by this bracket is a stud 16 forming a pivotal support for the body member which in the present construction comprises two sections 17 and 18, this body member having bearings on the stud, indicated at 19 and 20. The body member has a chamber 21 for liquid such as oil, and is made in two sections for purposes of facilitating assembly and manufacture. The two sections 17 and 18 have flanges 22 and 23 which are secured together through the bolts 24. In the form shown the chamber 21 is in the section 18 and is open at its rear side which is closed by the section 17.

Mounted on the stud 16 within the chamber 21 is a division wall 25. This member is rigidly secured to the stud by any suitable means, such as the pin 26, so that it cannot turn on the stud. As shown in Fig. 1, the lower wall 27 of the chamber is formed on the arc of a circle with the axis of the stud 16 as the center. The division member 25 is of a length corresponding to the length of the chamber so that its opposite ends will engage the ends of the chamber and at its lower edge is curved to fit the wall 27, The upper portion 28 of this member about the stud is also curved with the axis of the stud as the center and engages the correspondingly curved top wall 29 of the chamber, so that during relative turning movements of the body or casing on the stud the four walls of the division member 25 will have a substantially close fit with the walls of the chamber and prevent any appreciable flow of liquid between the two compartments formed by this wall in the chamber.

Leading from the upper portion of each compartment is a restricted passage 30, and mounted on the top of the body is a separate member 31 which may be of any desired shape, but is preferably in the form of a ball. This may be of metal cast in one piece and has a vertical partition 32 dividing it into two separate chambers 33. This ball has a neck member 34 which is threaded, as shown at 35, so that it may be threaded into a tapped opening in the top of the body member, and this neck is formed on opposite sides of the partition 32 with passages 36 leading respectively from the chambers 33 to the passages 30, and therefore, each chamber 33 is in communication with one of the compartments in the body member on opposite sides of the division wall 25.

The body is also provided with laterally extending passages 37 leading to the passages 30 through which the oil may be fed to the compartments on opposite sides of the member 25, and they are then closed by the threaded plugs 38. The body member has an arm 39 which is secured through the link 40 to the end of the spring 11, this link, of course, being pivoted to the arm and the spring at the points 41 and 42 respectively.

In operation the compartments in the body member on opposite sides of the division wall 25 are filled with oil up to the desired level preferably to substantially fill these compartments leaving the chambers 33 filled with air. It will then be apparent that as the body or frame of the vehicle rises and falls relative to the axle 12 the body member will turn on the stud 16 and thus in effect causing the member 25 to swing to the right or left in the chamber 21, though actually this member remains stationary and it is the body member which swings about the stud 16 as a pivot. This relative movement between the body member and the division wall 25 will vary the volumes of the compartments in the body member and will force the oil in one compartment through its restricted passage 30 and passage 36 into the corresponding air chamber 33, thus compressing the air therein. This has a cushioning effect, and it will be obvious that when the frame of the vehicle moves in the opposite direction the body will move in the opposite direction and the compressed air will tend to force the liquid back into the compartment which has now become larger. However, the restricted passage between the liquid compartment and the air chamber will prevent a too rapid recovery, and therefore, will have a dampening effect and will reduce the rebound. Of course, the same action takes place on the opposite side of the member 25 with corresponding movements so that this device as constructed has the same effect on movement of the vehicle frame in either direction. It will also be clear that the device is very simple in construction, and as there is only a single moving element it will be very reliable in operation and not likely to be easily gotten out of order. There is, furthermore, no rubber or similar material which will deteriorate and thus become useless, and there are no valves to be displaced or become clogged.

In the form shown in Fig. 5 the operation is the same but instead of having the air chambers in a separate member secured to the casing, the casing 18' is cast with these chambers in the casing itself, the upper walls of the casing being extended to accommodate these chambers. These air chambers are shown at 33' and are separated by an integral division wall 44. The liquid compartments in chamber 21 on opposite sides of the division member 25 communicate with the respective air chambers 33' through the restricted passages 30' and the oil may be supplied through the lateral passages 37' as in the first form.

Although in the drawings the body or casing is shown as secured to the spring and the bracket 17 to the frame, it will, of course, be understood that this arrangement may be reversed and the casing secured to the frame while the bracket is secured to the spring as it is the effect of the relative movement between the casing and member 25 which gives the cushioning effect.

This shock absorber may also be used as a cushioning device for automobile bumpers and the like as shown in Fig. 6. As illustrated the bracket 17 is secured to the sides of the frame of the vehicle and the casing 18 or 18' is secured to the bumper 45 through the arm 39. Thus any shock on the bumper, instead of being transmitted directly to the frame, is cushioned through this device.

Having thus set forth the nature of my invention, what I claim is:

1. In a shock absorber for vehicles, a body member having a chamber for holding a liquid, a division member in said chamber and dividing it into two separate compartments, said members being mounted for relative turning movements, separate air chambers connected to said compartments respectively at the upper portions thereof, means whereby one of said members may be secured to some stationary part of the vehicle, and means whereby the other member may be secured to the vehicle spring or bumper.

2. In a shock absorber for vehicles, a bracket adapted to be secured to the frame of the vehicle, a body member mounted for turning movements on said bracket and provided with a chamber for liquid, a division wall in said chamber dividing it into separate compartments and rigidly secured to said bracket, means adapted for securing said body to a spring of the vehicle, and independent air chambers connected with said compartments.

3. In a shock absorber for vehicles, a bracket adapted to be secured to the frame of the vehicle, a stud carried by said bracket, a body member mounted for turning movements on said stud and provided with a chamber for liquid having a curved wall with the axis of the stud as a center, a partition wall secured to said stud and at its free edge engaging said curved wall to divide the chamber into separate compartments, independent air chambers connected to the respective compartments at the upper parts thereof, and means adapted for connecting said body to a spring of the vehicle.

4. In a shock absorber for vehicles, a bracket adapted to be secured to the frame of the vehicle, a stud carried by said bracket, a body member mounted for turning movements on said stud and having a wall formed on the arc of a circle with the axis of the stud as a center, a division wall secured to said stud in the chamber and fitting the walls of the chamber to divide it into separate compartments, a separate member secured to said body member and divided by a partition into separate air chambers, connections from said air chambers to the respective compartments, and means adapted for securing the body member to a spring of the vehicle.

5. In a shock absorber for vehicles, a bracket member, a body member mounted for turning movements on said bracket member and having a liquid chamber formed with a wall formed on the arc of a circle, a division wall secured to the bracket member and arranged in said chamber to divide it into separate compartments, independent air chambers connected to said compartments respectively, means for securing one of said members to a stationary part of the vehicle, and means adapted for securing the other member to a spring of the vehicle.

6. In a shock absorber for vehicles, a bracket member having a stud, a body member mounted for turning movements on said stud and provided with a liquid chamber with a curved wall having the axis of the stud as a center, a division wall secured to the stud and engaging the walls of the chamber to divide it into separate compartments, said body being provided with restricted passages leading from said compartments, and a hollow ball having a division wall dividing it into separate air chambers and having passages leading from said air chambers to the respective first mentioned passages.

7. In a shock absorber for vehicles, a bracket member, a body member mounted for relative turning movements therewith and having a liquid compartment, a wall secured to said fixed member and forming a wall of said compartment so that the volume of said compartment will vary due to the relative turning movements between the members, an air chamber connected with said compartment through a restricted passage, means for securing one of said members to the vehicle body, and means for securing the other member to a spring or a bumper of the vehicle.

In testimony whereof I affix my signature.
JAMES HENRY TAYLOR.